No. 634,771. Patented Oct. 10, 1899.
A. D. SMITH.
FLOUR SIFTER AND MIXER.
(Application filed Mar. 28, 1899.)
(No Model.)
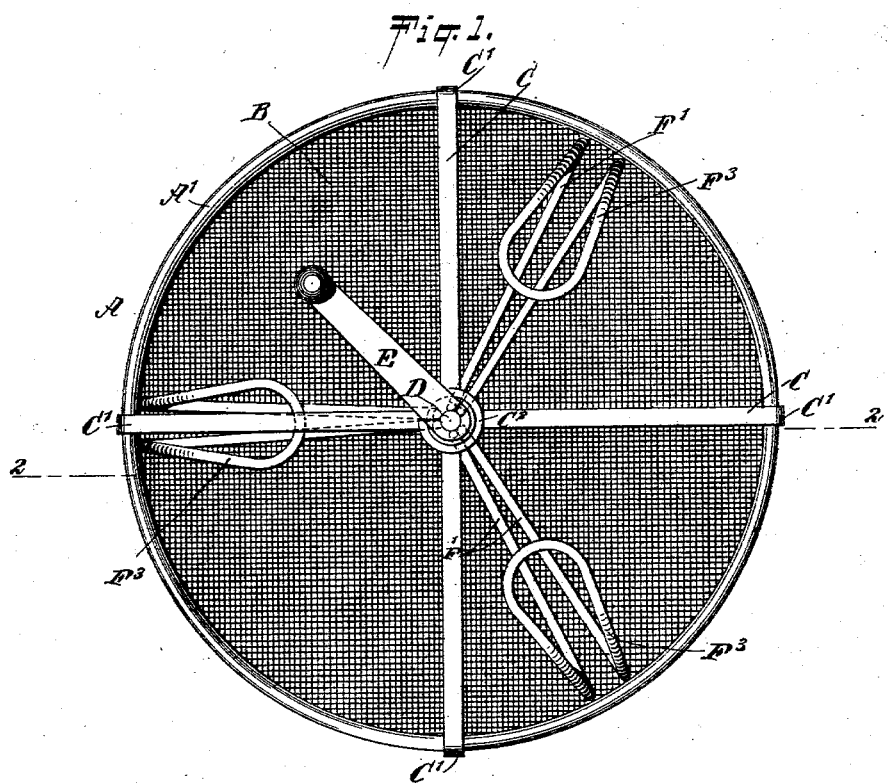
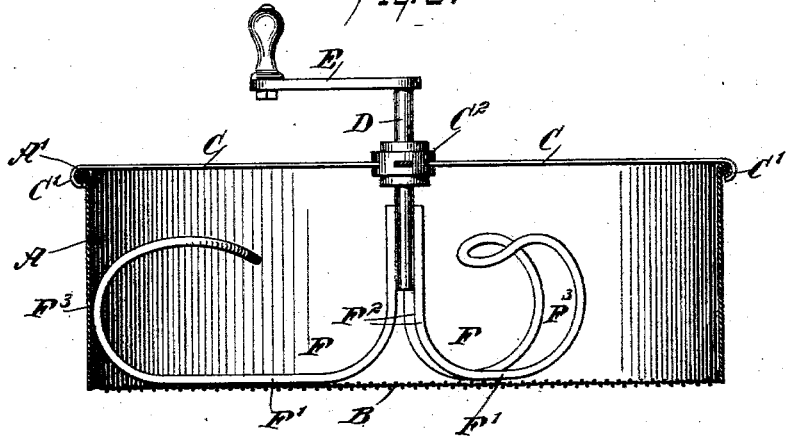
WITNESSES:
William P. Gaebel.
Geo. J. Hoster
INVENTOR
Annie Derby Smith
BY
Munn
ATTORNEYS.

UNITED STATES PATENT OFFICE.

ANNIE DERBY SMITH, OF WEST ORANGE, NEW JERSEY.

FLOUR SIFTER AND MIXER.

SPECIFICATION forming part of Letters Patent No. 634,771, dated October 10, 1899.

Application filed March 28, 1899. Serial No. 710,784. (No model.)

*To all whom it may concern:*

Be it known that I, ANNIE DERBY SMITH, of West Orange, in the county of Essex and State of New Jersey, have invented a new and Improved Flour Sifter and Mixer, of which the following is a full, clear, and exact description.

The object of the invention is to provide a new and improved flour sifter and mixer, which is simple and durable in construction, arranged to permit of readily opening up the flour, to thoroughly and uniformly incorporate baking-powder or other substance in the flour, to break up any lumps, and to gradually force the mixture of flour and powder through the meshes of the sieve in a finely-divided state.

The invention consists of novel features and parts and combinations of the same, as will be fully described hereinafter and then pointed out in the claim.

A practical embodiment of my invention is represented in the accompanying drawings, forming a part of this specification, in which similar characters of reference indicate corresponding parts in both the views.

Figure 1 is a plan view of the improvement, and Fig. 2 is a sectional side elevation of the same on the line 2 2 in Fig. 1.

The improved flour sieve and mixer is provided with a circular vessel A, having a sieve B for the bottom of suitable mesh and any desired material, and on the top of said vessel is secured a cross-shaped frame C, having the ends C' of its bars curved over the annular flange A' of the vessel A to securely hold the frame in position on the top of the vessel. The frame C is provided at its middle with a hub $C^2$, in which is journaled a vertically-disposed shaft D, provided at its upper end with a suitable crank-arm E, adapted to be taken hold of by the operator to turn the crank-arm and the said shaft D.

On the lower end of the shaft D is secured a pressing, mixing, and agitating device for opening up the flour and mixing baking-powder or the like with the flour and for pressing the mixture in a finely-divided state through the meshes or perforations of the sieve B. This device consists, essentially, of a number of bars of wire F, each bent to form two horizontally-extending arms F', spaced a short distance apart, as plainly indicated in Fig. 1, and extending over and in close proximity to the sieve B, the inner ends $F^2$ of said arms being curved upward to be fastened to the shaft D. The outer ends of the bars F' terminate in a loop $F^3$, which is curved upward and outward in close proximity to the inner face of the vessel A, and then upward and inward, and finally downward, to readily cut through the flour and open it up, to agitate said flour and properly mix the baking-power with the flour by throwing the substances over and over from the outside toward the middle, to insure a thorough mixing of the flour and baking-powder. By this peculiar form of loop the flour and powder are put in proper condition for the arms F' to finally force the flour and powder through the meshes of the sieve B.

It is expressly understood that when the shaft D is rotated the agitating, mixing, and pressing device moves around in the vessel A for the purpose described, very little power being required for the operation.

In case there are any small lumps in the flour they are thoroughly broken up either by being thrown over by the bent loops or by being crushed between the arms F' and the sieve B, so that all the material is finally forced in a finely-divided state through the meshes of the sieve.

Having thus fully described my invention, I claim as new and desire to secure by Letters Patent—

A flour sifter and mixer, comprising a circular vessel having a sieve-bottom, a skeleton frame secured to the top of the vessel by the arms of the frame being bent over the circular rim of the vessel, a shaft mounted to turn in the hub of said frame, a crank-arm on the upper end of said shaft, and a series of mixing and forcing devices secured to said shaft, and each consisting of a piece of wire bent to form straight arms extending over the sieve-bottom in close proximity thereto, the outer ends of the arms terminating in a loop bent upward, inward and downward to form a mixing and agitating device, as set forth.

ANNIE DERBY SMITH.

Witnesses:
WALDEMAR B. KAEMPFFERT.
EDWARD BOLTON MARSHALL.